Figure 3:
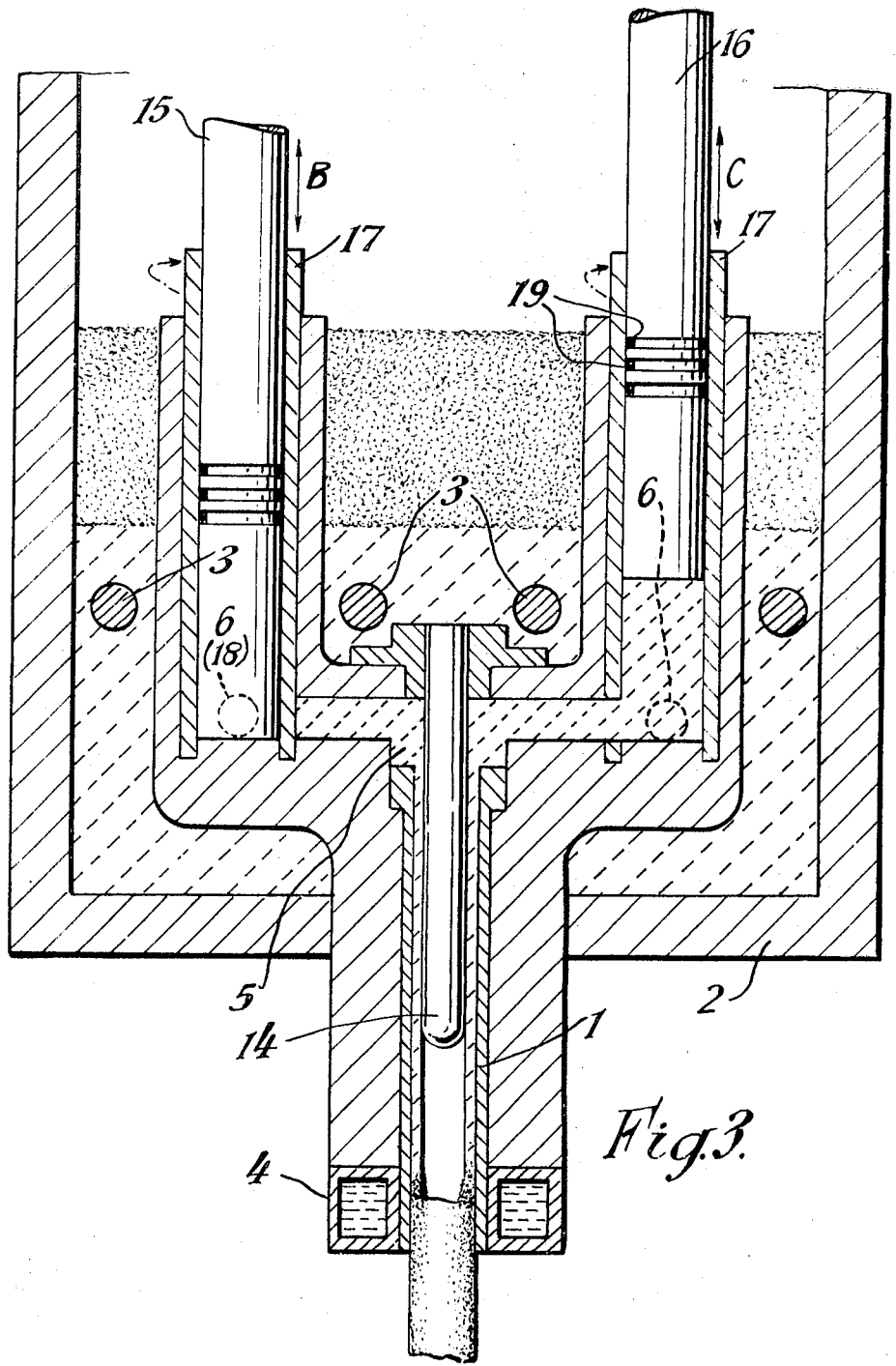

United States Patent
Edwards

[15] 3,660,065
[45] May 2, 1972

[54] METHOD OF MANUFACTURING EXTRUDATES

[72] Inventor: Frederick James Edwards, Northumberland, England

[73] Assignee: Thermal Syndicate Limited, Wallsend, Northumberland, England

[22] Filed: Aug. 11, 1970

[21] Appl. No.: 62,949

[30] Foreign Application Priority Data

Aug. 12, 1969 Great Britain .................. 40,178/69

[52] U.S. Cl. .................................. 65/66, 65/83, 65/85, 65/86, 65/129, 65/137, 65/183, 65/324, 65/DIG. 8
[51] Int. Cl. .................................. C03b 9/00, C03b 17/00
[58] Field of Search .............. 65/86, 87, 129, 130, 131, 132, 65/330, 331, 322, 328, 66, 83, 85, 137, 183, 324, 129

[56] References Cited

UNITED STATES PATENTS

| | | | |
|---|---|---|---|
| 1,802,072 | 4/1931 | Bethel | 65/331 X |
| 2,003,058 | 5/1935 | Stenhouse | 65/330 X |
| 2,055,676 | 9/1936 | Stewart | 65/131 |
| 2,077,147 | 4/1937 | Honiss | 65/332 X |
| 2,113,956 | 4/1938 | Wadsworth | 65/131 |
| 1,581,829 | 4/1926 | Berry | 65/DIG. 8 |
| 3,177,057 | 4/1965 | Potter et al. | 65/18 |
| 1,926,764 | 9/1933 | Dorman | 65/328 |
| 3,268,321 | 8/1966 | Chapman | 65/128 X |

*Primary Examiner*—Frank W. Miga
*Attorney*—Curtis, Morris & Safford

[57] ABSTRACT

This invention relates to a method of and apparatus for manufacturing an extrudate of high temperature thermoplastic material (e.g. vitreous silica). In simplest form the method comprises delivering the thermoplastic material in plastic state to an extrusion die by means of a pump, the pump output and the dimensions of the die being chosen so that the die contains and supports the thermoplastic material throughout its plastic range. Conveniently the apparatus comprises a reciprocating pump submerged in a reservoir of the thermoplastic material in plastic condition, the inlet side of the pump being arranged to take in plastic material directly from the reservoir and the pump outlet being connected directly to an extrusion die in a wall of the reservoir.

4 Claims, 3 Drawing Figures

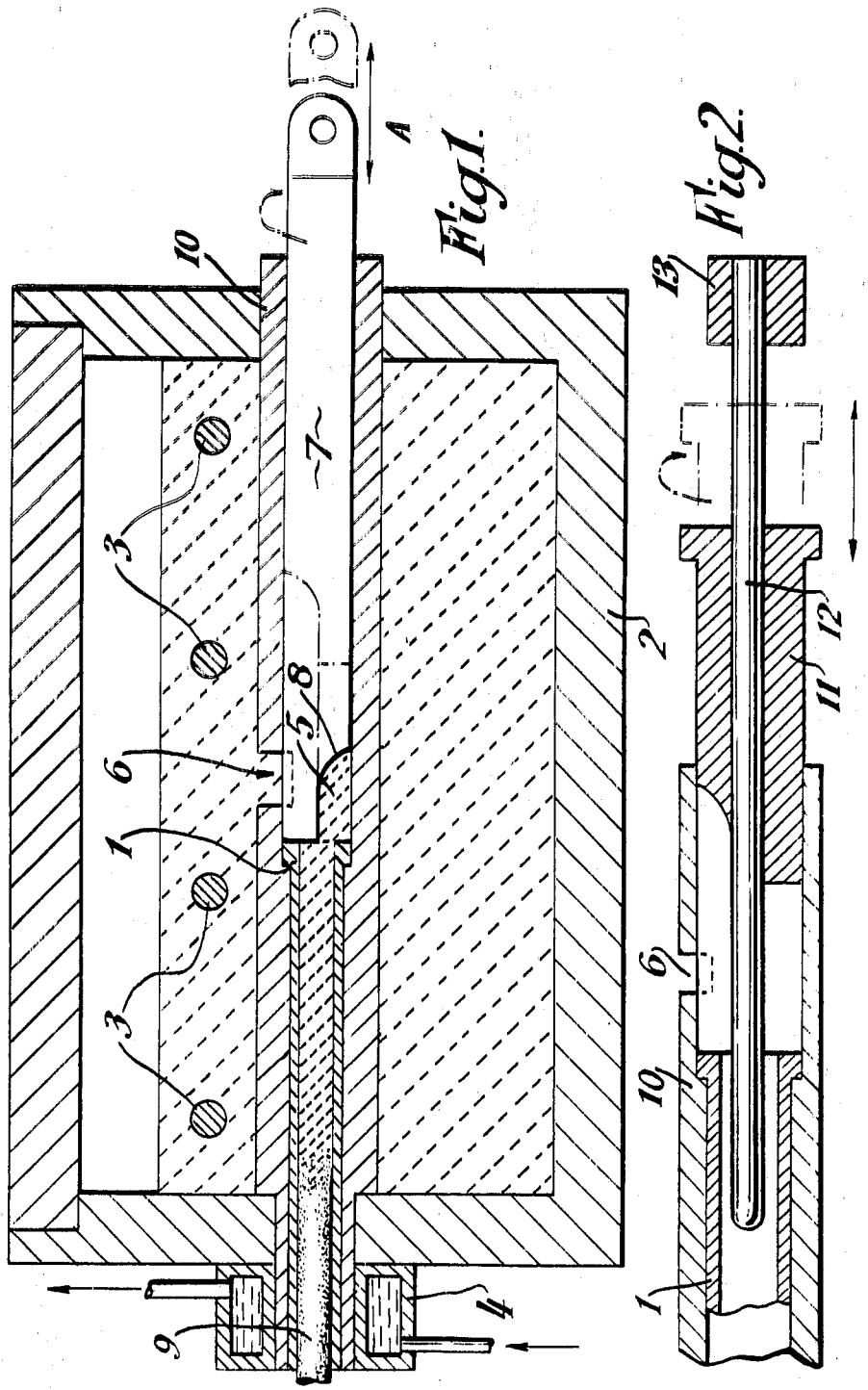

METHOD OF MANUFACTURING EXTRUDATES

This invention relates to a method of, and apparatus for, manufacturing extrudates of high temperature thermoplastic materials, by which we mean materials which have a softening point at a temperature above 1,000° C. In particular, but not exclusively, the invention is concerned with the extrusion of softened vitreous silica (i.e. extruding vitreous silica at a temperature of around 1,800° to 2,000° C.).

The conventional method of drawing tube or rod in vitreous silica is to employ a die (of graphite or refractory metal) as a metering outlet in the bottom of a tank containing softened vitreous silica and then to pull material through the die by means of a traction device located below the die. Since the traction device must, if it is to have any effect in the vicinity of the die, exert its influence on the softened material which has just left the die, the consequence of the known technique is that the cross-section of the hardened tube or rod produced by such a method is much smaller than the cross-section of the die through which it has been drawn. This has disadvantages in practice since it is difficult to exercise control on the degree of reduction in size which occurs and also it is difficult to ensure that accurate cross-sectional shapes are maintained in the rod or tube produced and in the case of tube of circular cross-section it is difficult to ensure a truly concentric bore of uniform cross-section.

What has long been desired in the processing of high temperature thermoplastic materials (and particularly in the case of vitreous silica) is a method of extruding the material in a manner in which a die is used not only as a metering orifice, but also as a dimensioning member. This invention relates to a method and apparatus by which this desirable object can be attained.

According to one aspect of the invention a method of manufacturing an extrudate of high temperature thermoplastic material comprises delivering the thermoplastic material in plastic state to an extrusion die by means of a pump, the pump output and the dimensions of the die being chosen so that the die contains and supports the thermoplastic material throughout its plastic range.

By employing the method of the invention, accurate sizing of the extrudate is obtained by allowing the thermoplastic material to harden while it is within the die. Because the pump thrusts plastic material into the die at the hot end there are no tension forces to be transmitted by plastic material leaving the die and accurate sizing is ensured.

In a preferred embodiment of the method according to the invention a reciprocating pump is submerged in a reservoir of the thermoplastic material in plastic condition, the inlet side of the pump being arranged to take in plastic material directly from the reservoir and the pump outlet being connected directly to the extrusion die, which may be arranged (horizontally or vertically) in a wall of the reservoir.

If the reciprocating pump is a single-cylinder pump, the extrudate will emerge from the die incrementally, the pauses in movement corresponding to the intervals in which the pump is drawing in material from the plastic mass. Each new charge of material drawn into the pump will be in a condition to join on to the material delivered to the die during the immediately preceding working stroke of the pump without leaving any planes of weakness, since the material on each side of the join will still be within the plastic range.

When a single-cylinder pump is employed in the above described manner, advantage can be taken of the pauses resulting from the pumping action to cut off the finished extrudate when convenient, so that the employment of travelling cut-off gear is avoided.

Instead of using one single-cylinder pump for delivering the plastic material to the extrusion die, a plurality of single cylinder pumps or a multi-cylinder pump, with the working strokes of the cylinders arranged out of phase with one another, may be arranged to deliver the plastic material to the extrusion die. In this way the extrudate can be given a more uniform emerging movement. Naturally, a plurality of extrusion dies, having the same or different dimensions, may be fed from a common pump or a common group of pumps submerged in the reservoir.

The level of the plastic material in the reservoir would be maintained by feeding make-up quantities of the material into the reservoir, preferably onto the free surface of the material in the reservoir, at a rate substantially equal to the rate at which the material is delivered to the die or dies. The plastic mass in the reservoir would be heated and maintained at the desired temperature by any suitable heating means (e.g. electric resistance heaters) arranged to provide the desired temperature gradients in the material.

The working parts of the pump employed in the method according to the invention would, of course, have to be fabricated from materials capable of withstanding long periods of use at the temperature of the hot thermoplastic material. Examples of suitable materials are the refractory metals, molybdenum, tungsten, iridium and refractory materials of high strength such as graphite, but this list is by no means comprehensive.

The method according to the invention may be employed for the manufacture of extrudates of any desired cross-sectional shape, for example tubes or rods of circular or rectangular cross-section.

According to a further aspect of the invention apparatus for manufacturing an extrudate of high temperature thermoplastic material comprises a refractory lined vessel, heating means for heating the contents of the vessel, an outlet in a wall of the vessel, die means in the outlet which communicates with a volume within the vessel containing a reciprocating member, the reciprocating member serving to compress material within the vessel which is trapped within the volume and force it from said vessel through the die means.

Two embodiments of apparatus for carrying out the method of the present invention will now be described, by way of example, with reference to the accompanying drawings, in which:

FIG. 1 is a schematic side elevation of a single-cylinder pump for extruding rod, FIG. 2 is a detail of the pump of FIG. 1 showing how it would be modified to extrude tube, and FIG. 3 is a side elevation of a double-cylinder pump for extruding tube.

Referring to both FIGS. 1 and 3, it will be seen that a tubular die member 1 projects through a refractory wall 2 of a tank containing vitreous silica raised to a temperature between 1,800° and 2,000° C by a plurality of resistive heating rods 3 (e.g. of tungsten or molybdenum) located within the tank. Sand, crushed rock crystal or other raw material supply in solid form is fed into the tank from time to time (e.g. through the open top of the tank as shown in FIG. 3) at a rate to match the rate at which material is extruded through the die.

In each case, the outer end of the die member 1 is surrounded by a cooling chamber 4 (through which water may flow) and the inner end defines a volume 5 into which material from the tank is drawn via one or more inlet ports 6.

In FIG. 1 there is a single piston 7, which reciprocates in the direction of the arrows A and rotates through 180° prior to each reciprocatory motion. A portion at the end of the piston 7 is cut away to define a recess 8 and the rotation of the piston is coordinated with the reciprocations, so that on each pumping stroke (when the piston 7 moves towards the die member 1) the cut away region is lowermost, but on each return stroke, the cut away region is uppermost (i.e. the recess 8 communicates with the port 6 as the piston moves away from the die member). This arrangement reduces the chance of plastic material, forced into the hot end of the die, being withdrawn from the die when the piston moves away from the die member 1. Each time the piston completes a pumping stroke new material is forced into the hot end of the die member 1, forcing hardened material 9 to leave the cold end. The die member 1 and the piston 7 are supported within a sleeve 10 of refractory material which in the embodiment shown extends right across the tank (meaning that the mechanical drive links to the piston 7 can be connected in a region of much lower temperature than exists within the tank). The sleeve can terminate within the tank and then the connections to the drive links will be made within the tank (although the actual motive means would be outside the tank).

The die member 1 will be operated with a substantial temperature gradient along its length and it may be desirable to taper the extrusion passage of the die member so that at operating temperature it has a substantially uniform bore throughout.

FIG. 1 shows equipment for producing a rod and, FIG. 2 shows how a hollow piston 11 can be employed with a mandrel 12 to define an annular die and effect the production of tube. The end of the mandrel 12 may be rigidly supported at 13.

FIG. 3 shows a double-cylinder pump for producing tube. The die member 1 in FIG. 3 is disposed with its axis vertical and a mandrel 14 extends through the volume 5 into the hot end of the die member 1 to define an annular die space. The two pistons 15 and 16 reciprocate out of phase with each other in the direction of the arrows B and C and are each associated with a sleeve valve 17. The valves 17 each contain a port 18 which in one position of the sleeve valve 17 communicates with the port 6 (thus allowing the piston to draw in material from the tank 1) and in the other position allows material in the sleeve valve to be pumped into the volume 5. Conventionally shaped piston rings 19 (of refractory metal) may be used to prevent leakage of plastic material around the pistons.

It will be seen that the vertical arrangement shown in FIG. 3 will not be quite as satisfactory as the horizontal one shown in FIG. 1 as far as ease of protection (against oxidation) of the vital parts of the pump are concerned, for they will not be so completely protected by immersion in the plastic material in the case of the vertical arrangement.

This invention seeks to obtain sections of finished dimensions and acceptable surface condition by means of a single heat process. The point at which any make-up material is added and fused to maintain the general working level should therefore be sufficiently remote from the in-take ports of the pump or pumps to ensure that only completely fused material is handled by them.

The embodiments illustrated are purely exemplary of the invention and it will be appreciated that considerable modifications can be made in design details without departing from the scope of the invention as defined in the ensuing claims. Thus, for example although the specific arrangements shown in FIGS. 1 and 3 show electric heaters for fusing the vitreous silica, it will be appreciated that in some cases it may be preferable to employ an oxy/hydrogen or other high temperature flame.

What is claimed is:

1. A method of continuously manufacturing an elongated article of vitreous silica having a defined constant cross-sectional shape, said method comprising:
   a. supplying solid vitreous silica material in particulate form to a refractory lined vessel,
   b. heating the material within the vessel to a temperature above 1,800° C. to form a plastic mass within the vessel below a layer of the particulate material,
   c. periodically drawing discreet volumes of plastic material from said mass and pumping each volume under pressure into the inlet end of an extrusion die, whose outlet end is without the vessel and is shaped to said cross-sectional shape of the article,
   d. cooling the die adjacent to its outlet end to a temperature below the softening point of vitreous silica and so dimensioning the die, relative to the flow rate of vitreous silica therethrough, that the die contains and supports the vitreous silica throughout its plastic range while the join between adjacent volumes pumped into the die occurs when the trailing end of the first volume is still in its plastic range, and
   e. adding additional quantities of solid material to the layer in the vessel to make good the loss of plastics material from the mass.

2. A method as claimed in claim 1 in which the pumping action is substantially continuous by the use of a multi-cylinder pump, the working strokes of the cylinders being arranged out of phase with one another.

3. A method as claimed in claim 1 in which the die has a substantially uniform bore throughout when subjected to the temperature gradient prevailing during operation.

4. A method of continuously manufacturing an elongated article of vitreous silica having a defined constant cross-sectional shape, said method comprising:
   a. supplying as required solid silica material to a fusing vessel,
   b. heating the material within the vessel to a temperature above 1,800°C to form a plastic mass of vitreous silica precursor within the vessel,
   c. periodically pumping discreet volumes of plastic material from said mass under pressure into the inlet end of an extrusion die, whose outlet end is without the vessel and is shaped to said cross-sectional shape of the article, and
   d. cooling the die adjacent to its outlet end to a temperature below the softening point of vitreous silica and so dimensioning the die, relative to the flow rate of vitreous silica therethrough, that the die contains and supports the vitreous silica throughout its plastic range while the join between adjacent volumes pumped into the die occurs when the trailing end of the leading volume is still in its plastic range.

* * * * *